Patented Oct. 26, 1954

2,692,882

UNITED STATES PATENT OFFICE 2,692,882

(5-BENZYLOXY-3-INDOLE)-ALKANOYL-AMIDES AND PREPARATION THEREOF

Merrill E. Speeter, Kalamazoo, Mich., assignor to The Upjohn Company, Kalamazoo, Mich., a corporation of Michigan No Drawing. Application April 1, 1952,
Serial No. 279,931

20 Claims. (Cl. 260—319)

The present invention relates to novel organic compounds, and is more particularly concerned with a novel process for the preparation of (5 - benzyloxy - 3 - indole) - alkanoylamides and with the products thus-produced.

The compounds of the present invention may be represented by the formula:

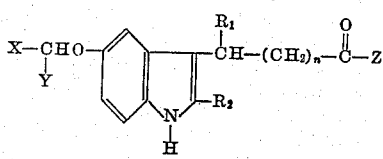

wherein X represents phenyl, halophenyl, lower alkoxyphenyl, or lower alkylphenyl; Y represents hydrogen, phenyl, halophenyl, lower alkoxyphenyl, or lower alkylphenyl; $R_1$ and $R_2$ represent hydrogen or lower-alkyl; and $n$ is selected from zero and one. Z represents the amido radical

wherein $R_3$ represents hydrogen, and saturated hydrocarbon radicals such as alkyl, cycloalkyl, phenyl, and aralkyl, and $R_4$ represents saturated hydrocarbon radicals such as alkyl, cycloalkyl, phenyl, and aralkyl. The secondary and tertiary amido radicals thus represented by Z include such radicals as alkylamido, cycloalkylamido, aralkylamido, phenylamido, dicycloalkylamido, diaralkylamido, dialkylamido, diphenylamido, alkyl aralkylamido, alkyl cycloalkylamido, alkyl phenylamido, aralkyl cycloalkylamido, aralkyl phenylamido, or cycloalkylphenylamido, and Z can also represent a saturated monoheterocyclic amido radical selected from five and six atom saturated monoheterocyclic amido radicals, including amido radicals such as piperidid, morpholid, thiomorpholid, pyrrolidid, or the like.

It is an object of the present invention to prepare novel compounds, (5-benzyloxy-3-indole)-alkanoylamides. It is a further object of the present invention to provide a novel process for the preparation of the (5-benzyloxy-3-indole)-alkanoylamides. Other objects of the invention will be apparent to one skilled in the art to which the invention pertains.

The novel compounds of the present invention are important intermediates in the preparation of (5 - hydroxy - 3 - indole)-alkylamines. More specifically the (5 - hydroxy - 3 - indole) - alkylamines include 5-hydroxytryptamine, or more briefly named, serotonin, a substance known to possess powerful vasoconstrictor qualities, and analogs thereof, such as the 5-hydroxy-3-[2-(N-methylamino)-ethyl]-indole, 5-hydroxy-3-[2-(N-isopropylamino)-ethyl]-indole, and the like, which analogs have also demonstrated marked vasoconstrictor qualities.

In the preparation of (5-hydroxy-3-indole)-alkylamines, the compounds of the present invention, the (5-benzyloxy-3-indole)-alkanoylamides, are reduced to the (5-benzyloxy-3-indole)-alkylamines, e. g., 5-benzyloxy-3-[2-(N-benzyl-N-methylamino)-ethyl]-indole, by a suitable reducing agent, e. g., lithium aluminum hydride. The reduction is usually conducted in an organic solvent, e. g., tetrahydrofuran, and after a reaction period of from thirty minutes to five hours the (5-benzyloxy-3-indole)-alkylamine free bases are obtained as heavy non-crystalline oils, or in some instances as a crystalline compound. The free base, without isolation, may be reacted with a stoichiometric quantity of an acid, such as hydrochloric, to form the (5-benzyloxy-3-indole)-alkylamine acid addition salt. Similarly a quaternary ammonium salt may also be prepared by reacting the tertiary amine free base with an alkyl halide or aralkyl halide. Alternatively the free base may be isolated by removal of the solvent and admixed with a stoichiometric quantity of an acid, e. g., hydrochloric, to form the acid addition salt and similarly the isolated tertiary amine free base may be mixed with an alkyl halide to form the quaternary ammonium salt. The reduction of the (5-benzyloxy-3-indole)-alkanoylamides can also be accomplished catalytically, in which case platinum is the preferred catalyst. Serotonin and serotonin analogs are prepared from the (5-benzyloxy-3-indole)-alkylamine salts, if the free base is converted thereto, by reconverting the salt to the free base, and then subjecting the free base to hydrogenolysis in the presence of a catalyst, such as a ten per cent palladium-charcoal catalyst. The hydrogen pressures employed for the hydrogenolysis may range from slightly under atmospheric to about two or three atmospheres, although higher pressures can also be used. Serotonin and the serotonin analogs can then be isolated by filtering to remove the catalyst, and concentrating and evaporating the solvent employed. The isolated serotonin and serotonin analogs are in some instances obtained as non-crystalline, water-insoluble oils, which may be converted to a more adaptable water-soluble acid addition salt by reaction with a stoichiometric quantity of acid such as hydrochloric, or by the addition of sulfuric acid and creatinine sulfate, which salt may then be precipitated from the mixture by the addition of an appropriate precipitating agent, e. g., acetone is the preferred reagent for the precipitation of the serotonin creatinine sulfate from solution. Similarly quaternary ammonium salts of the tertiary amine serotonin analogs may also be prepared. Alternatively the serotonin and serotonin analog acid addition salts may be prepared by treating the serotonin or serotonin analogs, without isolation from the reaction mixture, with a stoichiometric quantity of an acid, or with a mixture of sulfuric acid and creatinine sulfate, and in a similar manner an alkyl halide can be employed to prepare quaternary ammonium salts of the tertiary amine serotonin analogs. An additional alternative method for the preparation of the acid addition salts, or serotonin analog quaternary ammonium salts, involves the direct debenzylation of an alcoholic solution of a (5-benzyloxy-3-indole)-alkylamine salt in the presence of the catalyst and hydrogen whereafter the serotonin and serotonin analog salts are precipitated therefrom as indicated previously. The hydrogenolysis of the (5-benzyloxy-3-indole)-alkylamines may also be accomplished by reaction with sodium and liquid ammonia.

According to the method of the present invention the (5-benzyloxy-3-indole)-alkanoylamides are prepared by the reaction of a Grignard reagent with a 5-benzyloxyindole represented by the formula:

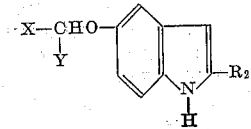

wherein X, Y, and $R_2$ have the values specified above, to convert the 5-benzyloxyindole into a Grignard reagent, and thereafter reacting the 5-benzyloxyindole Grignard reagent with a haloalkanoylamide, such as the α-haloacetamides, β-halopropionamides, or the like, represented by the general formula:

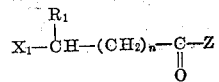

wherein $X_1$ represents a halogen, i. e., chlorine, iodine, or bromine, and $R_1$, Z, and $n$ have the same values as given above, to thus produce the desired (5-benzyloxy-3-indole)-alkanoylamide.

The compounds which are used as starting materials for the method of the present invention, the 5-benzyloxyindoles, may be prepared according to the method of Burton and Stoves [J. Chem. Soc. 1937, 1726]. Alternatively the starting compounds used in the method of the present invention may be prepared by the reductive cyclization of 5-benzyloxy-β,2-dinitrostyrenes, as more fully disclosed in my co-pending application, Serial Number 273,149, filed February 23, 1952. The 5-benzyloxy-β,2-dinitrostyrenes are prepared by the dehydration of 5-benzyloxy-2-nitro-α-[1-(1-nitroalkyl)]benzyl alcohols, as more fully disclosed in my co-pending application, Serial Number 273,-148, filed February 23, 1952. The 5-benzyloxy-2-nitro-α-[1-(1-nitroalkyl)]benzyl alcohols are prepared by the condensation of 5-benzyloxy-2-nitrobenzaldehydes with a 1-nitroalkane, as more fully disclosed in my co-pending application, Serial Number 273,147, filed February 23, 1952. The 5-benzyloxy-2-nitrobenzaldehydes are prepared according to the method of Burton [J. Chem. Soc. 1935, 1265] or Portmann and Giovannini [Helv. Chim. Acta, 31, 1381 (1948)].

In carrying out the method of the present invention, the starting 5-benzyloxyindole and Grignard reagent are usually reacted together in the presence of an organic solvent, diethyl ether and dibutyl ether being preferred, although other organic solvents, suitable for use in Grignard reactions, such as benzene, toluene, or anisole, can also be employed. In some instances dimethylformamide may also be utilized. For the Grignard step a great many Grignard reagents are satisfactory, among them being those prepared from alkyl halides, cycloalkyl halides, aryl halides, and aralkyl halides, the lower-alkyl halides, such as methyl iodide and ethyl iodide being preferred. The preparation of the 5-benzyloxyindole Grignard reagent is usually conducted at the boiling point of the solvent employed, although other temperatures between about zero and 150 degrees centigrade, preferably between about zero and 100 degrees centigrade, may also be used, a longer reaction period being required in the lower temperature ranges. The resulting 5-benzyloxyindole-magnesium halide is then reacted with a haloalkanoylamide such as the α-haloacetamides, β-halopropionamides, or the like, in the presence of the same organic solvent utilized in the preparation of the Grignard reactant although others may also be used if desired. The reaction of the haloalkanoylamide and the 5-benzyloxyindolemagnesium halide is usually conducted at the boiling point of the solvent employed, although other temperatures between about zero and 150 degrees centigrade, preferably about 100 degrees centigrade, may also be used. Upon removal of the organic solvent by distillation, the remaining residue is heated on a steam bath, and a heavy oil is obtained upon cooling. The (5-benzyloxy-3-indole)-alkanoylamide may then be isolated from the oil as a crystalline product. In some instances the (5-benzyloxy-3-indole)-alkanoylamide need not be isolated as a crystalline product, in which case the oil may be treated directly with a reducing agent to produce the (5-benzyloxy-3-indole)-alkylamine. One method for the separation of the (5-benzyloxy-3-indole)-alkanoylamides from the oil involves the addition of an organic solvent, such as ether, chloroform, or benzene, with ether being preferred, to the oil, and hydrolyzing the mixture as with dilute acetic acid, whereupon the (5-benzyloxy-3-indole)-alkanoylamide separates from the mixture. After filtration, the product may be recrystallized from alcohol to a greater degree of purity.

The preparation of the haloalkanoylamides utilized in the process of the present invention involves the addition of an acid halide to ether, cooling in an ice-bath, and adding thereto an amine with vigorous stirring, whereupon a heavy precipitate forms and may be removed by filtration. The precipitate is usually washed with several portions of ether and the combined filtrate then distilled under vacuum to remove the solvent and produce the desired haloalkanoylamide.

Representative haloalkanoylamides which can be reacted with a chosen 5-benzyloxyindolemagnesium halide to produce the desired (5-benzyloxy-3-indole)-alkanoylamides include the α-haloacetamides such as the α-halo-N-alkyl-N-aralkylacetamides, e. g., α-chloro-N-methyl-N-benzylacetamide, α-chloro-N-benzyl-N-isopropylacetamide; α-halo-N,N-dialkylacetamides, e. g., α-chloro-N,N-dimethylacetamide, α-chloro-N,N-dibutylacetamide, α-iodo-N,N-diethylacetamide; α-halo-N,N-diaralkylacetamides, e. g., α-chloro-N,N-dibenzylacetamide; α-halo-N,N-dicycloalkylacetamides, e. g., α-chloro-N,N-dicyclohexylacetamide; α - halo-α-alkyl-N-alkyl-N-aralkylacetamides, e. g., α-chloro - α - methyl-N-methyl-N-benzylacetamide; α-halo-N-aralkyl-N-cycloalkylacetamides, e. g., α-chloro-N-benzyl-N-cyclohexylacetamide, α - bromo-N-phenethyl-N-cyclopentylacetamide; α-halo-acetylpiperidides, e. g., α-chloroacetylpiperidide, and the β-halopropionamides, e. g., β-chloro-N,N-diethylpropionamide, β-iodopropionylpiperidide, β-chloro-β-methyl-N-methyl - N - benzylpropionamide, and the like. Other methods for the preparation of the starting haloalkanoylamides are disclosed by Buehler et al. [J. Am. Chem. Soc., 59, 421, (1937)], Jacobs et al. [J. Biol. Chem., 21, 148 (1915)], or Frericks [Arch. Pharm. 241, 218 (1903)].

The following examples will serve to illustrate the process and products of this invention, but the said invention is not to be considered as limited thereto.

*Example 1.—α-3-(5-benzyloxyindole)-N-benzyl-N-methylacetamide*

To a Grignard reagent prepared from 4.25 grams (0.03 mole) of methyl iodide and 2.4 grams of magnesium in 200 milliliters of ether was added a solution of 5.5 grams (0.025 mole) of 5-benzyloxyindole in 200 milliliters of ether. After heating under reflux for thirty minutes, the mixture was cooled in an ice-bath and a solution of 5.9 grams (0.03 mole) of α-chloro-N-benzyl-N-methylacetamide in 200 milliliters of ether was added thereto. The mixture was stirred and the ether removed by distillation, whereafter the reddish gummy residue was warmed for three hours on a steam bath. The mixture was cooled and approximately 500 milliliters of ether was added, followed by the addition with vigorous stirring of a solution of five milliliters of glacial acetic acid and 95 milliliters of water. A light colored solid separated from solution, and after standing overnight the product was filtered and recrystallized from isopropanol. The α-3-(5-benzyloxyindole)-N-benzyl-N - methylacetamide melted at 151–152 degrees centigrade; yield, 7.5 grams (78 percent).

*Analysis.*—Percent calculated for $C_{25}H_{24}O_2N_2$: C, 78.13; H, 6.29. Found: C, 78.26; H, 6.21.

*Example 2.—α-3-(5-benzyloxyindole)-N,N-dibenzylacetamide*

In essentially the same manner as disclosed in Example 1, α-3-(5-benzyloxyindole)-N,N-dibenzylacetamide, having a melting point of 156–157 degrees centigrade, is prepared by reacting methyl iodide Grignard reagent with 5-benzyloxyindole, and thereafter reacting the 5-benzyloxyindolemagnesium iodide with α-chloro-N,N-dibenzylacetamide to produce α-3-(5 - benzyloxyindole)-N,N-dibenzylacetamide in 69 percent yield.

*Analysis.*—Percent calculated for $C_{31}H_{28}O_2N_2$: C, 80.84; H, 6.13; N, 6.08. Found: C, 80.98; H, 7.17; N, 5.91.

*Example 3.—α-3-(5-benzyloxyindole)-N-benzylacetamide*

In essentially the same manner as disclosed in Example 1, α-3-(5-benzyloxyindole)-N-benzylacetamide, having a melting point of 185–186 degrees centigrade, is prepared by reacting methyl iodide Grignard reagent with 5-benzyloxyindole, and thereafter reacting the 5-benzyloxyindolemagnesium iodide with α-chloro-N-benzylacetamide to produce α-3-(5-benzyloxyindole)-N-benzylacetamide in thirty percent yield.

*Analysis.*—Percent calculated for $C_{24}H_{22}O_2N_2$: C, 77.77; H, 5.98; N, 7.56. Found: C, 77.74; H, 6.12; N, 7.24.

*Example 4.—α-3-(5-benzyloxy-2-methylindole)-N-methylacetamide*

In essentially the same manner as disclosed in Example 1, α-3-(5-benzyloxy-2-methylindole)-N-methylacetamide is prepared by reacting methyl iodide Grignard reagent with 5-benzyloxy-2-methylindole, and thereafter reacting the 5 - benzyloxy - 2 - methylindolemagnesium iodide with α-bromo-N-methylacetamide.

In the same manner the following (5-benzyloxy-3-indole)-alkanoylamides are prepared by utilizing the selected 5-benzyloxy-2-alkylindole and the chosen haloalkanoylamide: α-3-(5-benzyloxy - 2 - ethylindole) - N,N - dibenzylacetamide, α - 3 - (5-benzyloxy-2-propylindole)-N-cyclohexylacetamide, α-3-(5-benzyloxy-2-ethylindole)-α-methyl - N - benzylacetamide, β-3-(5-benzyloxy-2-methylindole) - N - benzylpropionamide and the like.

*Example 5.—β - 3-[5-(para,para'-dimethylbenzhydryloxy)-indole] - β - methyl-N,N-dibenzylpropionamide*

In essentially the same manner as disclosed in Example 1, β - 3 - [5 - (para,para'-dimethylbenzhydryloxy)-indole] - β - methyl - N,N - dibenzylpropionamide is prepared by reacting ethyl iodide Grignard reagent with 5-(para,para'-dimethylbenzhydryloxy)-indole, and thereafter reacting the 5 - (para,para' - dimethylbenzhydryloxy)-indolemagnesium iodide with β-chloro-β-methyl-N,N-dibenzylpropionamide.

In the same manner the following (5-benzyloxy-3-indole)-alkanoylamides are prepared by reacting the selected 5-alkylbenzyloxyindole and chosen haloalkanoylamide: α-3-[5-(para,para'-diethylbenzhydryloxy)-indole] - α - propyl - N - methyl - N - cyclohexylacetamide, α-3-[5 -(para-methylbenzyloxy)-indole] - N - benzylacetamide, α - 3 - [5(para-ethylbenzyloxy)-2-methylindole]-N - phenylacetamide, α-3-[5- (para-propylbenzyloxy)-indole]-N-isopropyl - N - benzylacetamide, α - 3 - [5 - (para,para'- dimethylbenzhydryloxy)-indole] - N - isopropylacetamide, β - 3 - [5-(para-ethylbenzyloxy) - indole] - β - methyl-N-benzyl-propionamide, and the like.

*Example 6.—α - 3 - (5-benzhydryloxyindole)-N-benzylacetamide*

In essentially the same manner as shown in Example 1, α - 3 - (5 - benzhydryloxyindole) - N-benzylacetamide is prepared by reacting methyl iodide Grignard reagent with 5-benzhydryloxyindole, and thereafter reacting the 5-benzhydryloxyindolemagnesium iodide with α-chloro-N-benzylacetamide.

In the same manner the following (5-benzyloxy-3-indole)-alkanoylamides are prepared by reacting 5-benzhydryloxyindole with the selected haloalkanoylamide: α-3-(5-benzhydryloxyindole)-N-cyclopentyl-N-ethylacetamide, α-3-(5-benzhydryloxyindole)-α-ethyl-N,N-diphenylacetamide, α-3-(5-benzhydryloxyindole)-N-phenethylacetamide, α-3-(5-benzhydryloxy-2-ethylindole)-N-benzyl-N-methylacetamide, β-3-(5-benzhydryloxyindole)-N-methyl-N-benzylpropionamide, β-3-(5-benzhydryloxyindole)-β-ethyl-N-methylpropionamide, and the like.

*Example 7.—α-3-[5-(para,para'-dichlorobenzhydryloxy)-2-ethylindole]-N-methyl-N-benzylacetamide*

In essentially the same manner as shown in Example 1, α-3-[5-(para,para'-dichlorobenzhydryloxy)-2-ethylindole]-N-methyl-N-benzylacetamide is prepared by reacting ethyl bromide Grignard reagent with 5-(para,para'-dichlorobenzhydryloxy)-2-ethylindole, and thereafter reacting the 5-(para,para'-dichlorobenzhydryloxy)-2-ethylindolemagnesium bromide with α-iodo-N-methyl-N-benzylacetamide.

In the same manner the following (5-benzyloxy-3-indole)-alkanoylamides are prepared by reacting the selected 5-halobenzyloxyindole and chosen haloalkanoylamide: α-3-[5-(para,para'-dichlorobenzhydryloxy)-indole]-α-ethyl-N-methyl-N-benzylacetamide, α-3-[5-(para-iodobenzyloxy)-indole]-N,N-dicyclohexylacetamide, β-3-[5-(para,para'-dichlorobenzhydryloxy)-indole]-N-isopropylpropionamide, β-3-[5-(para-bromobenzyloxy)-indole]-β-ethyl-N-methylpropionamide, and the like.

*Example 8.—β-3-[5-(para,para'-dimethoxybenzhydryloxy)-indole]-N,N-dibenzylpropionamide*

In essentially the same manner as shown in Example 1, β-3-[5-(para,para'-dimethoxybenzhydryloxy)-indole]-N,N-dibenzylpropionamide is prepared by reacting methyl iodide Grignard reagent with 5-(para,para'-dimethoxybenzhydryloxy)-indole, and thereafter reacting the 5-(para,para'-dimethoxybenzhydryloxy)-indolemagnesium iodide with β-chloro-N,N-dibenzylpropionamide.

In the same manner the following (5-benzyloxy-3-indole)-alkanoylamides are prepared by reacting the selected 5-alkoxybenzyloxyindole and the chosen haloalkanoylamide: α-3-[5-(para,para'-dimethoxybenzhydryloxy)-indole]-α-propyl-N-ethyl-N-cyclohexylacetamide, α-3-[5-(para-methoxybenzyloxy)-indole]-N,N-dicyclohexylacetamide, α-3-[5-(para-propoxybenzyloxy)-indole]-N-benzyl-N-cyclopentylacetamide, α-3-[5-(para-ethoxybenzyloxy)-2-propylindole]-N-benzylacetamide, α-3-[5-(para,para'-dimethoxybenzhydryloxy)-indole]-N,N-dibenzylacetamide, β-3-[5-(para-ethoxybenzyloxy)-indole]-β-ethyl-N-benzylpropionamide, and the like.

*Example 9.—α-3-(5-benzyloxyindole)-N-benzyl-N-isopropylacetamide*

In essentially the same manner as shown in Example 1, α-3-(5-benzyloxyindole)-N-benzyl-N-isopropylacetamide is prepared by reacting methyl iodide Grignard reagent with 5-benzyloxyindole, and thereafter reacting the 5-benzyloxyindolemagnesium iodide with α-chloro-N-benzyl-N-isopropylacetamide.

In the same manner the following 5-benzyloxy-3-indole-alkanoylamides are prepared by reacting 5-benzyloxyindole and the chosen haloalkanoylamide: α-3-(5-benzyloxyindole)-N,N-dibutylacetamide, α-3-(5-benzyloxyindole)-N-benzyl-N-cyclohexylacetamide, and the like.

*Example 10.—β-3-(5-benzyloxyindole)-N,N-diethylpropionamide*

In essentially the same manner as shown in Example 1, β-3-(5-benzyloxyindole)-N,N-diethylpropionamide is prepared by reacting methyl iodide Grignard reagent with 5-benzyloxyindole, and thereafter reacting the 5-benzyloxyindolemagnesium iodide with β-chloro-N,N-diethylpropionamide.

In the same manner the following (5-benzyloxy-3-indole)-alkanoylamides are prepared by reacting 5-benzyloxyindole with the chosen haloalkanoylamide: β-3-(5-benzyloxyindole)-N-isopropylpropionamide, β-3-(5-benzyloxyindole)-N,N-dimethylpropionamide, β-3-(5-benzyloxyindole)-N-methyl-N-benzylpropionamide, β-3-(5-benzyloxyindole)-β-methyl-N-benzylpropionamide, and the like.

*Example 11.—α-3-(5-benzyloxyindole)-acetopiperidide*

In essentially the same manner as disclosed in Example 1, α-3-(5-benzyloxyindole)-acetapiperidide is prepared by reacting methyl iodide Grignard reagent with 5-benzyloxyindole, and thereafter reacting the 5-benzyloxyindolemagnesium iodide with α-chloracetylpiperidide to produce α-3-(5-benzyloxyindole)-acetopiperidide.

In the same manner the following are prepared by utilizing the selected 5-benzyloxyindole and the chosen haloalkanoylamide: α-3-(5-benzyloxyindole)-α-methyl-acetopiperidide, α-3-(5-benzyloxy-2-ethylindole)-acetopiperidide, α-3-(5-benzyloxyindole)-acetopyrrolidide, α-3-(5-benzyloxyindole)-acetomorpholide, α-3-(5-benzyloxyindole)-acetothiomorpholide, β-3-(5-benzyloxyindole)-propionopiperidide, β-3-(5-benzyloxyindole)-β-ethyl-propionopyrrolidide, and the like.

It is to be understood that the invention is not to be limited to the exact details of operation or exact compounds shown and described, as obvious modifications and equivalents will be apparent to one skilled in the art, and the invention is therefore to be limited only to the scope of the appended claims.

I claim:

1. In a process for the preparation of a (5-benzyloxy-3-indole)-alkanoylamide, the steps of mixing a 5-benzyloxyindole with a Grignard reagent, and reacting the thus-produced 5-benzyloxyindolemagnesium halide with a haloalkanoylamide selected from the group consisting of secondary and tertiary α-haloacetamides and β-halopropionamides to produce a (5-benzyloxy-3-indole)-alkanoylamide.

2. In a process for the preparation of a (5-benzyloxy-3-indole)-alkanoylamide, the steps of reacting a 5-benzyloxyindole having the formula:

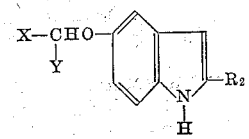

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_2$ is selected from the group consisting of hydrogen and lower alkyl, with a Grignard reagent at a temperature between about zero and 150 degrees centigrade in the presence of an organic solvent, and reacting the thus-produced 5-benzyloxyindolemagnesium halide at a temperature between about zero and 150 degrees centigrade with a haloalkanoylamide having the formula:

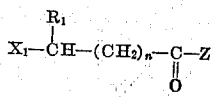

wherein $R_1$ is selected from the group consisting of hydrogen and lower alkyl, $n$ is selected from the group consisting of zero and one, $X_1$ is a halogen, and Z is selected from the group consisting of secondary and tertiary amido radicals, to produce a (5-benzyloxy-3-indole)-alkanoyl-amide.

3. In a process for the preparation of a (5-benzyloxy-3-indole)-alkanoylamide, the steps of reacting a 5-benzyloxyindole having the formula:

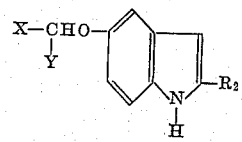

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_2$ is selected from the group consisting of hydrogen and lower alkyl, with a Grignard reagent at a temperature between about zero to 150 degrees centigrade in the presence of an organic solvent, and reacting the thus-produced 5-benzyloxy-indolemagnesium halide at a temperature between about zero and 150 degrees centigrade with a haloalkanoylamide having the formula:

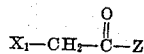

wherein $X_1$ is a halogen and Z is a tertiary amido radical, to produce a (5-benzyloxy-3-indole)-alkanoylamide.

4. The process of claim 3 wherein Z is a di-(lower-alkyl)-amido radical.

5. In a process for the preparation of a (5-benzyloxy-3-indole)-alkanoylamide, the steps of reacting a 5-benzyloxyindole having the formula:

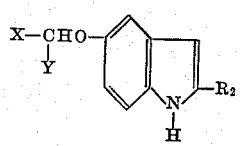

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and $R_2$ is selected from the group consisting of hydrogen and lower alkyl, with a Grignard reagent at a temperature between about zero to 150 degrees centigrade in the presence of an organic solvent, and reacting the thus-produced 5-benzoyloxy-indolemagnesium halide at a temperature between about zero and 150 degrees centigrade with a haloalkanoylamide having the formula:

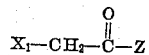

wherein $X_1$ is a halogen and Z is a secondary amido radical, to produce a (5-benzyloxy-3-indole)-alkanoylamide.

6. The process of claim 5 wherein Z is a lower-cycloalkylamido radical.

7. The process of claim 5 wherein Z is a lower-alkylamido radical.

8. In a process for the preparation of an α-3-(5-benzyloxyindole) - N - aralkyl - N - alkylacetamide, the steps of mixing 5-benzyloxyindole with a Grignard reagent, and then reacting an α-halo-N-aralkyl-N-alkyl acetamide with the thus-produced 5-benzyloxyindolemagnesium halide to produce an α-3-(5-benzyloxyindole)-N-aralkyl-N-alkylacetamide.

9. In a process for the preparation of an α-3-(5 - benzyloxyindole) - N - aralkylacetamide, the steps of mixing 5-benzyloxyindole with a Grignard reagent, and then reacting an α-halo-N-aralkylacetamide with the thus-produced 5-benzyloxyindolemagnesium halide to produce an α-3-(5-benzyloxyindole)-N-aralkylacetamide.

10. In a process for the preparation of a β-3-(5 - benzyloxyindole) - N,N-dialkylpropionamide, the steps of mixing 5-benzyloxyindole with a Grignard reagent, and then reacting a β-halo-N,N-dialkylpropionamide with the thus-produced 5-benzyloxyindolemagnesium halide to produce a β-3-(5 - benzyloxyindole) - N,N - dialkylpropionamide.

11. A (5 - benzyloxy-3-indole) - alkanoylamide having the formula:

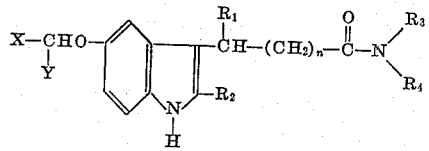

wherein X is taken from the group consisting of phenyl, halophenyl, lower alkoxyphenyl, and lower alkylphenyl, Y is taken from the group consisting of hydrogen, phenyl, halophenyl, lower alkoxyphenyl, and lower alkylphenyl, $R_1$ and $R_2$ are taken from the group consisting of hydrogen and lower alkyl, $n$ is selected from the group consisting of zero and one, and $R_3$ and $R_4$ are taken from the group consisting of hydrogen, alkyl, cycloalkyl, aralkyl, and phenyl, at least one of $R_3$ and $R_4$ being other than hydrogen, and further members of the group wherein the radicals $R_3$ and $R_4$ together with the —N< form a saturated monoheterocyclic amido radical selected from the group consisting of five and six atom saturated monoheterocyclic amido radicals.

12. A (5 - benzyloxy-3-indole)-alkanoylamide having the formula:

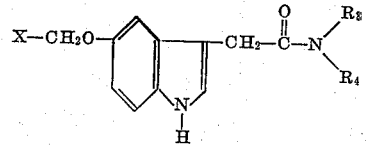

wherein X is phenyl, and $R_3$ and $R_4$ are saturated hydrocarbon radicals which together contain up to fourteen carbon atoms inclusive.

13. α - 3 - (5 - benzyloxyindole) - N - benzyl - N - methylacetamide.

14. α-3-(5 - benzyloxyindole) - N,N - dibenzyl-acetamide.

15. A (5-benzyloxy - 3 - indole)-alkanoylamide having the formula:

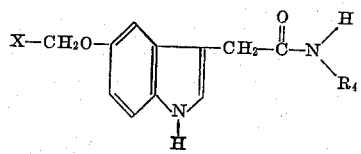

wherein X is phenyl, and $R_4$ is a saturated hydrocarbon radical containing up to seven carbon atoms inclusive.

16. α-3-(5-benzyloxyindole)-N-benzylacetamide.

17. A (5-benzyloxy-3-indole)-alkanoylamide having the formula:

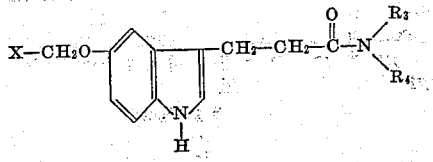

wherein X is phenyl, and R₃ and R₄ are saturated hydrocarbon radicals which together contain up to fourteen carbon atoms inclusive.

18. β-3-(5-benzyloxyindole)-N,N-diethylpropionamide.

19. A (5-benzyloxy-3-indole)-alkanoylamide having the formula:

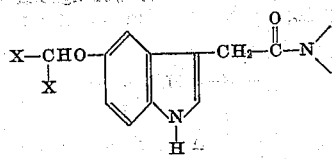

wherein X and Y are phenyl, and R₄ is a saturated hydrocarbon radical containing up to seven carbon atoms inclusive.

20. α-3-(5-benzhydryloxyindole)-N-benzylacetamide.

No references cited.